G. B. Isham.
Culinary Apparatus.
Nº 77,884. Patented May 12, 1868.

Witnesses
John B. Hollenbeck
E. C. Ryer

Inventor.
Geo B Isham

United States Patent Office.

GEORGE B. ISHAM, OF BURLINGTON, VERMONT.

Letters Patent No. 77,884, dated May 12, 1868.

IMPROVEMENT IN CULINARY APPARATUS.

*The Schedule referred to in these Letters Patent and making part of the same.*

TO ALL WHOM IT MAY CONCERN:

Be it known that I, GEORGE B. ISHAM, of the city of Burlington, in the county of Chittenden, and State of Vermont, have invented a new and improved Combination Culinary Apparatus; and I do hereby declare that the following is a full and exact description thereof, reference being had to the accompanying drawings, and the letters of reference marked thereon.

Figure 3:
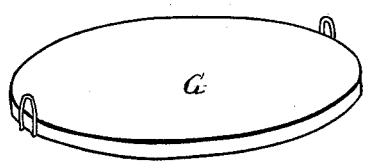
Figure 4:
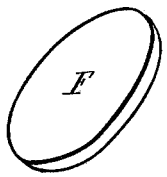
Figure 5:
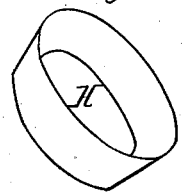
Figure 1:
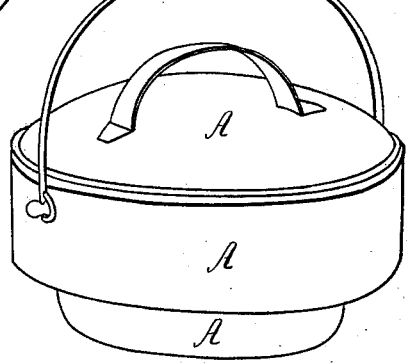
Figure 2:
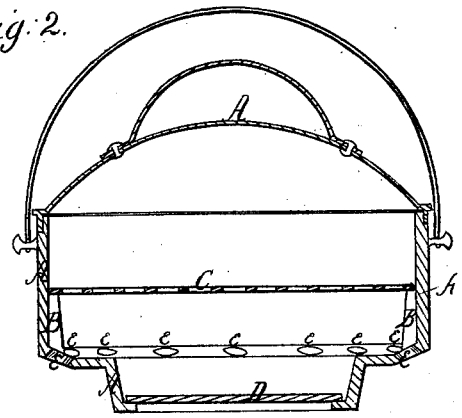

Figure 1, perspective.
Figure 2, section through centre of apparatus.
Figure 3, soapstone disk or griddle.
Figure 4, soapstone disk for bottom of apparatus.
Figure 5, metallic pan for steaming.

The nature of my invention consists in the combination of a baker, broiler, steamer, fryer, &c., under one cover, and in the same apparatus, the whole being arranged to use on or in the pot-hole of a stove or range.

To enable others skilled in the art to make and use my invention, I will proceed to describe its construction and operation.

I make the outside, A, of suitable metal, cast or otherwise, in the form as shown, or any other substantially the same, and placing on the inside the standards B B B, for the purpose of supporting the metallic perforated disk C.

The lower, or that part of the outside, A, that goes into the pot-hole, is made of such size and form as to insure its fitting on the stove or range perfectly, and is constructed with a detachable bottom, D, for purposes hereinafter stated.

Through the shoulder of the outside, A, I make a series of holes, E E E E, for the purpose of allowing a circulation of hot air arising from the stove to pass through the apparatus while in use.

The detachable bottom D is so constructed as to be readily and easily removed, if necessary, to allow a greater amount of heat to pass directly into the apparatus, or for the purpose of adjusting the soapstone disk F in its place for checking the heat.

I also make, and use in connection with the outside, A, the soapstone or other disk G, for the purpose of baking griddle-cakes, &c.

The basin H is used, in connection with the outside, A, and the perforated disk, C, for steaming potatoes, bread, &c.

To bake pies, potatoes, puddings, meats, &c., use the perforated disk, C, in connection with the outside, A, regulating the heat by means of the detachable bottoms F and D.

To broil meats, toast bread, &c., use the perforated disk, C, leaving out the detachable bottoms F and D.

To bake griddle and other cakes, place the soapstone, or other disk, G, in the outside, A, on the standards B B, first taking out the detachable bottoms F and D.

I do not claim any of the parts when used separately, except the outside, A; but What I do claim as my invention, and desire to secure by Letters Patent, is—

1. The combination of the several parts of a culinary apparatus, or steamer, baker, broiler, and fryer combined, all as herein described, and for the purpose set forth.

2. The particular construction of the outside, A, with its detachable bottoms F and D, all as herein described, and for the purpose as set forth.

GEO. B. ISHAM,

Witnesses:
E. C. RYER,
JOHN B. HOLLENBECK.